Figure 1:
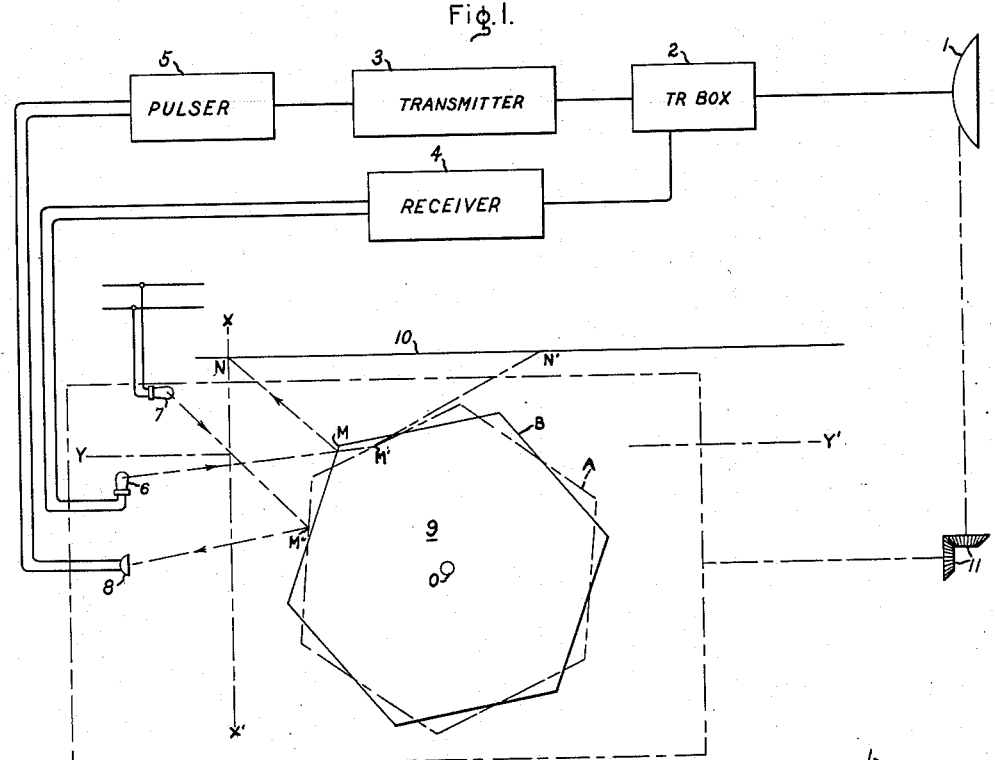

May 19, 1953     C. W. MILLER     2,639,421

OPTICAL PROJECTION DISPLAY SYSTEM

Filed April 14, 1948     2 Sheets-Sheet 1

Inventor:
Charles W. Miller,
by Merton D Morse
His Attorney.

May 19, 1953  C. W. MILLER  2,639,421
OPTICAL PROJECTION DISPLAY SYSTEM
Filed April 14, 1948  2 Sheets—Sheet 2

Inventor:
Charles W. Miller,
by *Merton D. Morse*
His Attorney.

Patented May 19, 1953

2,639,421

UNITED STATES PATENT OFFICE 2,639,421

OPTICAL PROJECTION DISPLAY SYSTEM

Charles W. Miller, Sale, England, assignor to General Electric Company, a corporation of New York Application April 14, 1948, Serial No. 20,982
In Great Britain April 17, 1947

1 Claim. (Cl. 343—11)

My invention relates to radar equipment and, more particularly, to apparatus for displaying the echoes which arrive at the receiver from targets.

In a radar system the range is measured by the time required for a high frequency pulse to travel from the transmitter to the target and for a portion of the energy to be reflected back to the receiver. In order to utilize such a system, it is necessary that there be some means for presenting the range information received. It is also desirable to present the range information simultaneously with information on the direction of the target causing the reflection.

It is an object of my invention to provide an improved radar presentation system producing an image of great brilliance.

A further object of my invention is to provide a system of radar presentation adaptable for projection on a screen.

A further object of my invention is to provide an improved system of radar signal presentation that will simultaneously indicate both range and direction of the obstacles causing the echoes.

For additional objects and advantages and for a better understanding of the invention, attention is now directed to the following description and accompanying drawings, and also to the appended claims in which the features of the invention believed to be novel are particularly pointed out.

Figure 2:
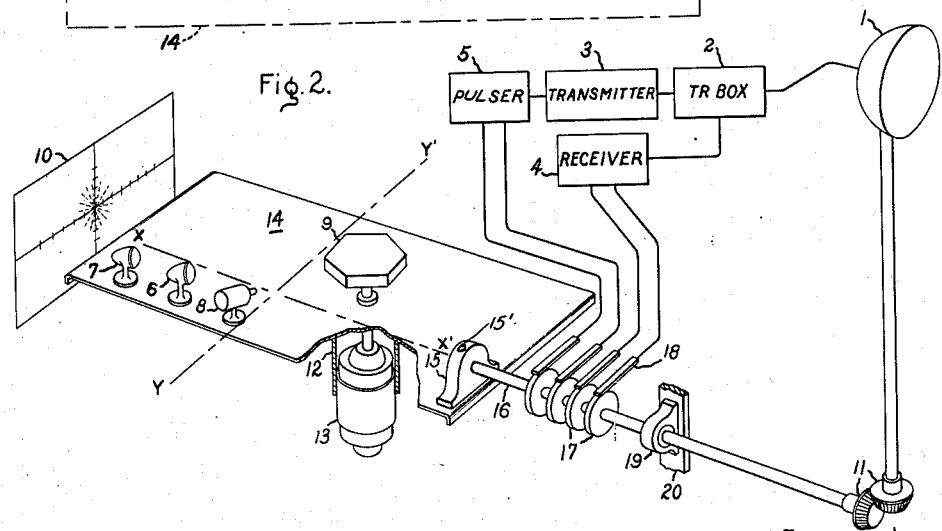
Figure 3:
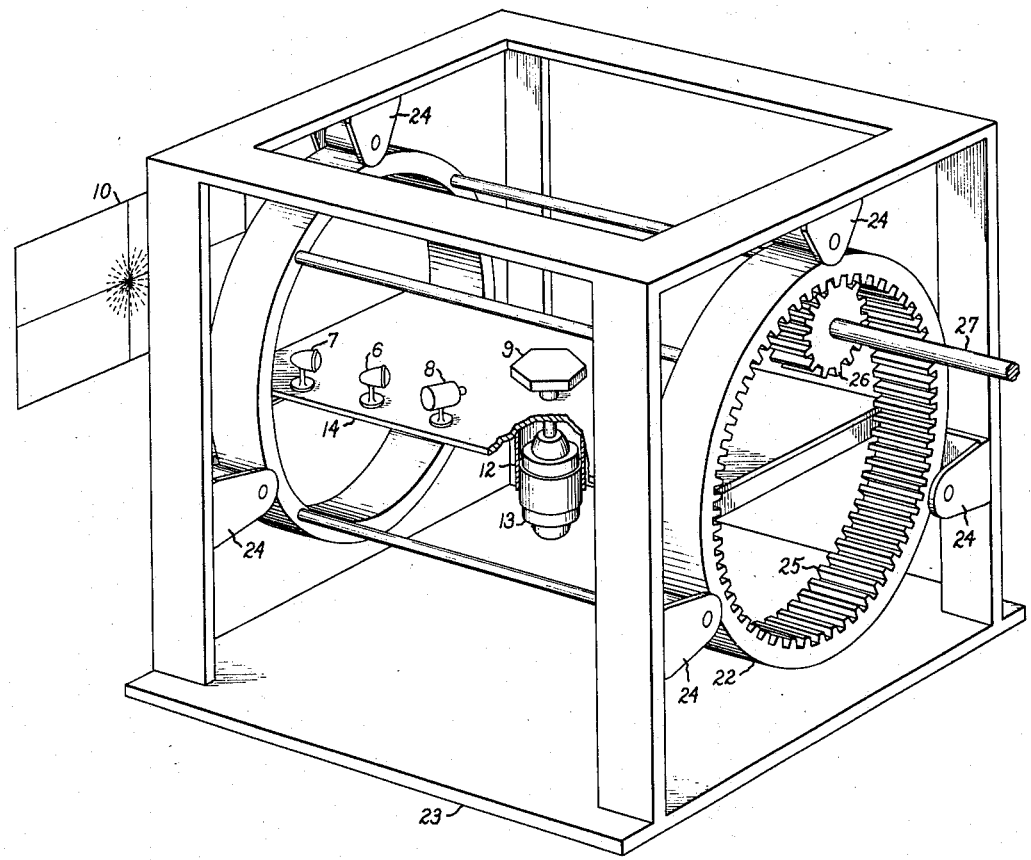

In the drawings:

Fig. 1 is a schematic diagram of a radar system containing one embodiment of my invention; and Figs. 2 and 3 are perspective views, partially schematic, illustrating different methods in which portions of the apparatus of Fig. 1 may be mounted.

According to my invention, the apparatus for displaying the echoes which arrive at a radar receiver, comprises a light source arranged for modulation in accordance with the time instants at which the echoes arrive, together with a rotatable reflecting device having a number of reflecting surfaces and arranged, when rotated, to reflect the light upon a screen in a succession of substantially linear sweeps. The starting points of the sweeps are synchronized with the instants of transmission of the radar pulses so that the position of an echo along the sweep is an indication of its range. The light source is mounted on a carrier which is in itself movable so as to cause the linear sweep to be positioned on the screen in accordance with the direction of the received echoes. This arrangement is such as to produce a simultaneous indication of range and direction of the echoes.

In the drawings, these elements of the system whose details do not themselves form a part of the invention, and which are well known to those skilled in the art, have been shown only diagrammatically. Detailed description of such units will be omitted for brevity.

Referring now to Fig. 1, I have shown an antenna 1 which may be rotated by a suitable gear system 11 and which is connected to a transmitter 3 and receiver 4 by any known form of Transmit-Receive device or TR Box 2. A pulser 5 causes the transmitter 3 to impress recurrent pulses of high frequency on the directive antenna 1. The TR Box 2 protects the receiver 4 from the intense transmitted pulses and permits reflected pulses received at antenna 1 to be supplied to the receiver 4 without attenuation, as is well-known.

A discharge device 6, which may be any suitable discharge lamp, is connected to the output from the receiver 4 and provides a source of light modulated by the received pulses.

As is best shown in Fig. 2, the modulated light source 6 is mounted by any suitable means upon a carriage 14 so that a ray of light passing from the lamp 6 will fall upon a mirrored drum 9 that is also located on the carriage 14. A constant or unmodulated light source 7 is mounted on the carriage 14 so that a ray of light from the source 7 will be reflected from the mirrored drum 9 and, in certain positions of the drum, will energize a photoelectric cell 8 which provides synchronizing pulses for the pulser 5. The mirrored drum 9 (shown as hexagonal in this particular embodiment) is rotated about an axis through its center O. In Fig. 1, the dashed-line outline A and the solid-line outlet B represent two consecutive positions of the drum as it is rotated about O in a clockwise direction.

Consider first a ray of light passing from the source 6 through any suitable lens system (not shown) and falling on the mirrored drum when it is in the position B. It will be obvious, from geometry, that this ray will be reflected from the point M so as to fall on a screen 10 at the point N. Now when the mirrored drum 9 has rotated to position A, the ray will be reflected at the point M' so as to fall on the screen at N'.

For intermediate cases, it is obvious that the reflecting ray will fall on the screen 10 at the points between N and N', so that as the drum 9 rotates the spot of light will sweep over the screen from N to N'. Further rotation of the drum will repeat this process from successive faces so that a trace is produced for each 1/nth part of a revolution of the mirrored drum where n is its number of faces. In practice n should generally be large so that a fast time base could be achieved for moderate speeds of rotation of the drum. Now, if the source 6 is arranged to be modulated in accordance with the intensity of the received echoes, the brightness of the trace is also modulated in accordance with the echoes.

In order to synchronize the transmitter 3 with the time base, a pulse must be generated at the instant when the time base is commencing its sweep. There are numerous ways of doing this, one of which is to provide an auxiliary unmodulated light source 7 which produces a beam that is reflected either from the same or from another face of the mirrored drum at M'' and which sweeps over the photoelectric cell 8 to generate a pulse for each sweep. If the mirrored drum 9 and light sources 6 and 7 are mounted on a carriage, such as the carriage 14, and rotated about an axis XX' (that is, about a line perpendicular to the screen 10 and passing through N), the time base N, N' will be pivoted about N and it only remains to synchronize the rotation of the carriage with that of the directive antenna 1 through the spur gearing 11 to provide a display of the plan position indication (PPI) type. Alternately, by rotating the carriage about axis YY' a range vs. azimuth (B type) display can be produced.

Referring now to Fig. 2, in which corresponding elements have been given the same reference numerals as in Fig. 1, I have shown one physical embodiment in which the carriage 14, which supports the mirror 9, light sources 6 and 7 and photoelectric cell 8, is rigidly attached to a shaft 16 by means of a bracket 15 adapted to receive the shaft in a force fit, the shaft being rigidly secured in the bracket as by a pin 15'. The rigid attachment of the shaft to the carriage may be effected by any other suitable device. A constant speed motor 13 is mounted in a housing 12 that is secured underneath the carriage 14 to drive the mirror 9. The carriage 14 is supported by the shaft 16, and a bearing 19 and attached to support 20. For illustration, I have shown only one bearing and support. However, in practice several would be desirable.

Connections may be made to the various components mounted on carriage 14 by means of slip rings 17 and brushes 18.

Referring now to Fig. 3, another physical mounting arrangement is shown in which the carriage 14 is attached to a skeleton drum 22 which runs on roller guides 24 that are attached to a framework 23. The drum is rotated by a planetary gear system comprising ring gear 25 and pinion 26. Pinion 26 is secured to a drive shaft 27 rotated by any suitable means (not shown).

As previously mentioned, the carriage 14 may be rotated about axis XX' so that the linear sweep rotates about a point on the screen to produce a PPI type of display on screen 10, or alternatively, the carriage 14 may be oscillated through an acute angle about axis YY', corresponding to a sector being scanned, so as to produce a B type indication.

In a case in which the signals are transmitted over a range of compass bearings, the display may give a direct indication of the bearing of the echo and the axis of the sweep may rotate through a full 360 degrees about a point on the screen. Alternatively, the range of the display may be compressed for rotation so that a 180 degree displacement corresponds to a 360 degree variation of echo reception, or it may be expanded. It is also possible to give displays over a range of elevation angle, in which case the case the carriage 14 is coupled to an elevation drive mechanism for antenna 1 so that the rotation of the mirrored drum will give a horizontal trace indicating ground range while the carrier is oscillated to deflect the trace vertically for elevation. Such a system may be applicable in early warning equipment for detecting approach of aircraft.

In any case, the displacement in respect to direction of the echoes is in accordance with the direction from which the echoes are received. This may be effected by controlling the carriage 14 in accordance with the direction of the transmitted pulses or in accordance with the direction in which a receiving antenna is oriented or made receptive. In cases in which a common antenna is used for transmission and reception, the displacement in respect of direction may be in accordance with the direction of such common antenna.

From the foregoing, it will be apparent that the light source is modulated so that it is only effective to produce a beam, or to vary its intensity, when an echo is being received, and the transmitter is so synchronized with the mirrored drum movement that the radial distance at which the light appears from the center of rotation on the screen is a measure of the time for the signal to make the outward and return journeys. Hence, the radial position of the target indication is a measure of the range to the obstacle producing the reflection.

While certain specific embodiments have been shown and described, it will, of course, be understood that various modifications may be made without departing from the invention. The appended claim is, therefore, intended to cover any such modifications within the true spirit and scope of the invention.

What I claim as new and desire to secure by Letters Patent of the United States is:

Apparatus for displaying echo pulses arriving at a receiver from an obstacle located in the field of scan of an angularly moving, directive pulse transmitter comprising a light beam source and a reflector, rotatable about an axis, carried on a movable carriage, means for modulating the intensity of said light beam in accordance with received pulses, means for synchronizing rotation of said reflector about said axis with the transmission of pulses, and means for rotating said carriage together with said reflector and light source about another non-intersecting axis, and means for synchronizing rotation of said carrier about said other axis with the directivity of said transmitter.

CHARLES W. MILLER.

References Cited in the file of this patent
UNITED STATES PATENTS

| Number | Name | Date |
|---|---|---|
| 1,791,481 | Tervo | Feb. 3, 1931 |
| 1,977,875 | Donaldson | Oct. 23, 1934 |
| 2,099,872 | Stern | Nov. 23, 1937 |
| 2,285,593 | Lemert | June 9, 1942 |
| 2,412,670 | Epstein | Dec. 17, 1946 |
| 2,418,964 | Arenberg | Apr. 15, 1947 |
| 2,479,953 | Miller | Aug. 23, 1949 |
| 2,518,968 | Wolff | Aug. 15, 1950 |